2,847,361
SEPARATION OF HYDROGEN SULFIDE AND HYDROCARBONS FROM HYDROGEN STREAMS

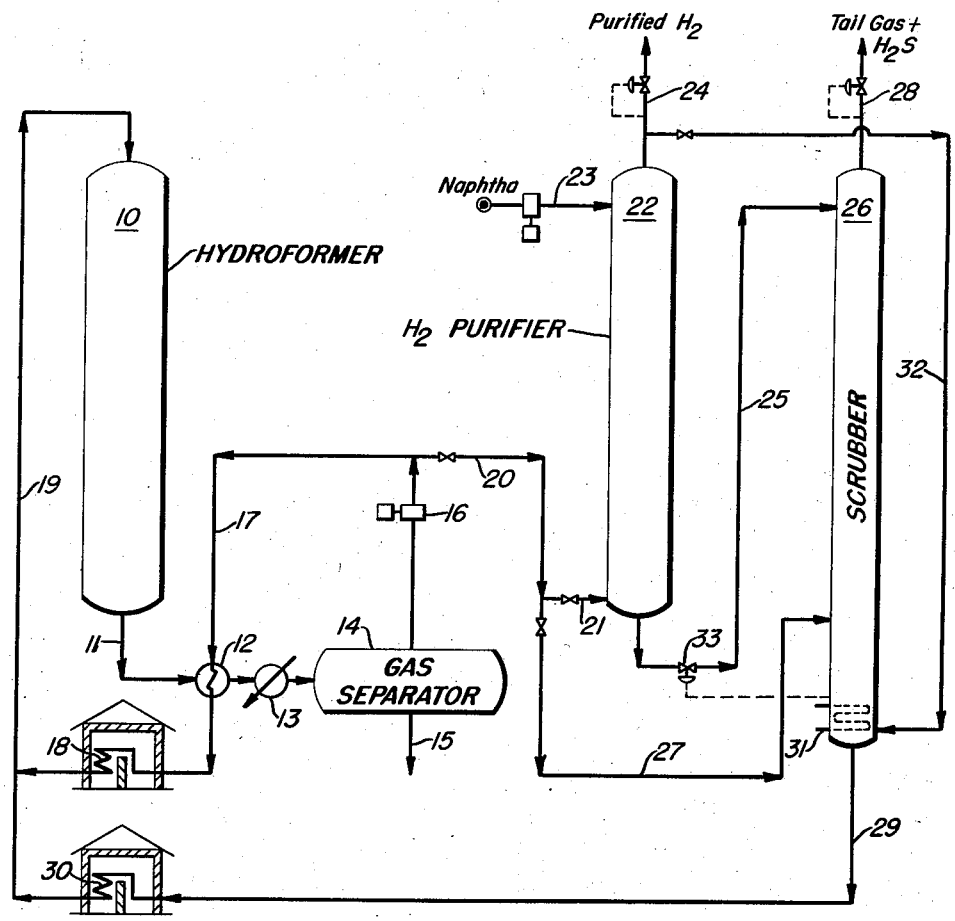

Robert J. Hengstebeck, Valparaiso, Ind., assignor to Standard Oil Company, Chicago, Ill., a corporation of Indiana Application April 12, 1954, Serial No. 422,323

5 Claims. (Cl. 196—50)

This invention relates to separation of hydrogen sulfide and hydrocarbons from hydrogen streams containing such components and it pertains more particularly to hydrogen enrichment and product recovery in naphtha hydroforming or hydrofining systems.

In many commercial processes for hydrofining hydrocarbons and/or hydroforming naphthas a hydrogen stream is separated from reactor effluent, a major portion of the separated hydrogen (either with or without purification and enrichment) being recycled with incoming charge and the remainder being withdrawn from the system after recovery of condensable hydrocarbons therefrom. An object of this invention is to provide an improved method and means for purifying a portion of the withdrawn hydrogen while recovering condensable hydrocarbons and eliminating hydrogen sulfide. A further object is to effect hydrogen enrichment and hydrocarbon recovery with minimum capital investment and operating cost. Other objects will be apparent as the detailed description of the invention proceeds.

In practicing the invention I employ a multiple absorption tower system through which an absorber oil is passed in series and portions of the hydrogen stream are passed in parallel. In the first absorption zone the ratio of absorber oil to impure hydrogen introduced is controlled to insure removal from the introduced hydrogen of most of the H₂S and condensable hydrocarbons so that a purified or enriched hydrogen stream is removed from the top of the zone. The rich absorber oil from the bottom of the first zone is introduced at the top of the second zone and the remainder of the impure hydrogen stream is introduced at the base of the second zone. In the second zone, which may be operated at lower pressure than the first, there may be no further absorption of H₂S but there will nevertheless be a recovery of condensable hydrocarbons so that the tail gas leaving the top of the second absorption zone will contain most of the H₂S. Substantially all of the condensable hydrocarbons are recovered in the rich oil leaving the base of the second absorption zone and H₂S may be stripped therefrom by heating and/or employing a stripping gas which may be a portion of the purified hydrogen.

The invention will be more clearly understood from the following detailed description of a specific example read in conjunction with the accompanying drawing which forms a part of this specification and which is a schematic flow diagram of a multiple tower system for practicing the invention.

In the hydroforming of a Mid-Continent naphtha boiling chiefly in the range of about 150 to 420° F., preferably 200 to 360° F., and containing about .01 to .1 percent or more of sulfur over a platinum-on-alumina catalyst at a pressure of about 100 to 750 p. s. i., a temperature in the range of 850 to 950° F. and a space velocity in the range of about 1 to 4 volumes of naphtha charge per hour per volume of catalyst with a hydrogen stream recycle rate of about 1,000 to 5,000 cubic feet per barrel, there is a net hydrogen production ranging from about 500 to 1,200 cubic feet per barrel of charging stock. The net hydrogen thus produced is usually separated from liquid reactor effluent at substantially reactor pressure and at a temperature obtainable by available cooling water so that the hydrogen stream contains appreciable amounts of condensable hydrocarbons and of H₂S.

The condensable hydrocarbons are usually recovered from the net hydrogen in an absorption zone by scrubbing the impure hydrogen stream with an absorption oil which may be incoming charge to the hydroformer or high boiling product produced in the hydroforming reaction. While such absorption removes most of the condensable hydrocarbons and a part of the H₂S, the H₂S content of the stream is necessarily divided between the absorber off gas and the rich absorber oil so that the hydrogen from the absorption zone still contains large amounts of H₂S. In my system I obtain a hydrogen stream which is substantially free from H₂S, a rich oil which likewise contains very little H₂S and a tail gas stream in which most of the H₂S is vented from the system.

Referring to the drawing, the Mid-Continent virgin naphtha boiling chiefly in the range of about 200 to 360° F. is hydroformed in reactor 10 in the presence of about 2,000 to 4,000 cubic feet per barrel of recycled hydrogen. Any known type of hydrofining or hydroforming catalyst may be employed but in this example the catalyst is of the platinum-on-alumina type and may be prepared, for example, as described in U. S. 2,659,701. The single reactor diagrammatically represents a reactor system which may include three or four separate reactors with intermediate reheaters, the inlet temperature to each reactor being about 900 to 975, e. g. 950° F., the pressure being in the range of about 100 to 500, e. g. about 300 p. s. i. g. and the over-all space velocity being in the range of about 1 to 4, e. g. about 2 pounds of naphtha charging stock per hour per pound of catalyst in the reaction system.

The reactor effluent passes by line 11 through heat exchanger 12 and cooler 13 to gas separator 14 which may operate at substantially reaction pressure but at a temperature of approximately 100° F. Liquid from the separator is withdrawn through line 15 to a conventional product recovery system. The separated gas is compressed by circulating compressor 16 and the major portion of the gas stream is recycled through line 17, heat exchanger 12, heater 18 and line 19 to the reaction system 10.

The net amount of produced hydrogen, which in this example may be about 1,000 cubic feet per barrel of naphtha charge, contains contaminating H₂S as well as condensable hydrocarbons. The removal of the H₂S from this net hydrogen stream by conventional methods would be expensive. In this example about 45 percent of the net hydrogen stream from line 20 is introduced by line 21 at the base of absorption column 22 which serves as a hydrogen purifier and into the top of which the incoming naphtha charge is introduced through line 23. By operating column 22 at a pressure of the order of 300 to 350 p. s. i. with effective countercurrent contact at ordinary temperatures, the incoming naphtha removes not only the condensable hydrocarbons but more than 90 percent, or substantially all, of the H₂S so that the hydrogen which is removed from the top of tower 22 by line 24 is enriched or purified.

The enriched liquid is transferred from the bottom of tower 22 by line 25 to the top of a second scrubbing tower 26 and the remaining 550 cubic feet per barrel of the net hydrogen is introduced by line 27 at a low point in tower 26. Since the scrubbing oil is now substantially saturated with H₂S, the function of the countercurrent scrubbing section in tower 26 is simply to recover condensable hydrocarbons from the $H_2S$-containing portion of the tail gas which is vented to a fuel line through line 28. Thus, by the simple expedient of employing two scrubbing zones instead of one, I am able to purify a substantial amount of the hydrogen with practically no additional operating expense.

The rich absorber oil from the bottom of tower 26 is passed by line 29 through heater 30 to line 19 for introduction to the hydroformer along with hot recycled hydrogen. When a platinum catalyst is employed and it is undesirable that the charge contain dissolved $H_2S$, tower 26 may be provided with a reheater 31 for stripping $H_2S$ out of the rich oil. Alternatively or in addition to the use of the reheater, tower 26 may be operated at somewhat lower pressure than tower 22 and a portion, e. g. about 10 to 20 cubic feet per barrel of the purified hydrogen from line 24 may be introduced by line 32 to the base of tower 26 for stripping $H_2S$ out of the enriched naphtha. A pressure reducing valve 33 may be employed in line 25 and controlled by the pressure at the base of tower 26 so that the stripping gas can be introduced by line 32 without further compression, a pump being employed when necessary in line 29. This technique enables a concentration of substantially all of the $H_2S$ in the tail gas which is vented through line 28 and the recovery of at least about one-third of the net hydrogen in purified or enriched form so that it can be employed for catalyst reduction or for hydrogenation of other hydrocarbons or organic materials.

While the invention has been described with reference to a particular example, it should be understood that it is not limited thereto. Alternative structural arrangements and operating conditions will be apparent from the above description to those skilled in the art. By increasing the absorption pressure, decreasing absorption temperature and/or decreasing the amount of gas introduced by line 21, the purity of the hydrogen removed through line 24 can be increased. In a system of the general type described, I prefer to introduce about 50 to 500 standard cubic feet of impure gas per barrel of absorber oil into the purification column and the remainder of the net hydrogen gas stream into the second absorption column. While naphthas are the preferred charging stocks to the hydroforming and hydrofining operations, higher boiling charging stocks such as heater oils, kerosene, distillate fuels and the like may be hydrofined, whether cracked or virgin.

I claim:

1. In a catalytic conversion system wherein there is a net production of hydrogen containing $H_2S$ and condensable hydrocarbons, the method of obtaining a purified hydrogen stream which comprises countercurrently scrubbing a portion of the net hydrogen stream with absorber oil in a first absorption zone under pressure for effecting removal of $H_2S$ and condensable hydrocarbons from said portion, countercurrently scrubbing the remainder of the net hydrogen stream in a second absorption zone with rich absorber oil obtained from the bottom of the first absorption zone whereby condensable hydrocarbons are recovered in the absorber oil from the total net hydrogen stream and the $H_2S$ from the total net hydrogen stream is concentrated in tail gas vented from the top of the second absorption zone.

2. The method of claim 1 which includes the further step of stripping $H_2S$ from rich absorber oil obtained in the second absorption zone.

3. The method of claim 2 wherein the stripping is effected with a portion of purified hydrogen leaving the top of the first absorption zone.

4. In a naphtha hydroforming system wherein a sulfur-containing naphtha is contacted with a hydroforming catalyst under hydroforming conditions in the presence of a recycled hydrogen stream and there is a net production of hydrogen containing $H_2S$ and condensable hydrocarbons, the method of operation which comprises scrubbing a portion of the net hydrogen with incoming naphtha charge at a pressure in the range of about 100 to 500 p. s. i. g. in a first absorption zone for removing both $H_2S$ and condensable hydrocarbons from said portion, scrubbing the remainder of the net hydrogen in a second absorption zone with absorption oil from the first absorption zone under conditions to effect recovery of condensable hydrocarbons and the venting of most of the total $H_2S$ from the top of the second absorption zone.

5. The method of claim 4 which includes the step of operating the second absorption zone at a lower pressure than the first absorption zone and stripping $H_2S$ from the rich absorber oil produced in the second absorption zone whereby the liquid from the second absorption zone is substantially freed from $H_2S$ before it is charged to the hydroforming step.

References Cited in the file of this patent

UNITED STATES PATENTS

| | | |
|---|---|---|
| 2,293,241 | Campbell | Aug. 18, 1942 |
| 2,431,920 | Cole | Dec. 2, 1947 |
| 2,580,478 | Stine | Jan. 1, 1952 |
| 2,614,658 | Maher et al. | Oct. 21, 1952 |
| 2,685,941 | Kassel | Aug. 10, 1954 |
| 2,691,623 | Hartley | Oct. 12, 1954 |
| 2,781,863 | Bloch et al. | Feb. 19, 1957 |